(12) United States Patent
Miyamoto

(10) Patent No.: US 10,197,318 B2
(45) Date of Patent: Feb. 5, 2019

(54) CHILLING MACHINE

(71) Applicant: AMADA HOLDINGS CO., LTD., Kanagawa (JP)

(72) Inventor: Yoshinao Miyamoto, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 82 days.

(21) Appl. No.: 15/122,272

(22) PCT Filed: Jan. 29, 2015

(86) PCT No.: PCT/JP2015/052502
§ 371 (c)(1),
(2) Date: Aug. 29, 2016

(87) PCT Pub. No.: WO2015/137000
PCT Pub. Date: Sep. 17, 2015

(65) Prior Publication Data
US 2016/0370047 A1    Dec. 22, 2016

(30) Foreign Application Priority Data
Mar. 10, 2014  (JP) ................................ 2014-045928

(51) Int. Cl.
*F25B 49/02* (2006.01)
*H01S 3/04* (2006.01)
(Continued)

(52) U.S. Cl.
CPC ............... *F25B 49/02* (2013.01); *F25B 1/00* (2013.01); *F25B 6/02* (2013.01); *F25B 29/003* (2013.01);
(Continued)

(58) Field of Classification Search
CPC ...... F25B 6/00; F25B 6/02; F25B 6/04; F25B 25/00; F25B 25/005; F25B 2400/0405; F25B 2400/0403; H01S 3/0407
See application file for complete search history.

(56) References Cited

U.S. PATENT DOCUMENTS 3,188,829 A    9/1965 Siewert et al.
3,529,432 A *  9/1970 Nussbaum ................ F25B 1/00
                                            62/196.3
(Continued)

FOREIGN PATENT DOCUMENTS

JP    6-323643    11/1994
JP    8-261626    10/1996
(Continued)

OTHER PUBLICATIONS

International Search Report, along with English-language translaiton thereof, in PCT/JP2015/052502 dated Apr. 14, 2015.
Search Report issued in European Patent Office (EPO) Patent Application No. 15760659.1, dated Nov. 3, 2017.

*Primary Examiner* — Christopher R Zerphey
(74) *Attorney, Agent, or Firm* — Greenblum & Bernstein, P.L.C.

(57) ABSTRACT

A chilling machine includes a refrigerant circuit; a compressor, a condenser and an evaporator that are provided on the refrigerant circuit; a coolant circuit including first and second supply paths to which coolant is supplied at different temperatures; and a chiller that cools the coolant. The coolant circuit includes a first supply path for supplying low temperature coolant to the first supply destination, and a second supply path for supplying high temperature coolant to the second supply destination. The refrigerant circuit includes a first reheater that increases temperature of the coolant flowing through the second supply path by heats of the refrigerant, a first selective path that supplies the refrigerant to the condenser by bypassing the first reheater, a
(Continued)

second selective path that supplies the refrigerant to the condenser through the first reheater, and a controller that adjusts quantity of the refrigerant passing through the first and second selective paths.

5 Claims, 7 Drawing Sheets

(51) Int. Cl.
*F25B 41/04* (2006.01)
*F25B 6/02* (2006.01)
*F25B 29/00* (2006.01)
*F25B 1/00* (2006.01)
*F25B 40/04* (2006.01)

(52) U.S. Cl.
CPC .............. *F25B 40/04* (2013.01); *F25B 41/04* (2013.01); *H01S 3/0407* (2013.01); *F25B 2400/01* (2013.01); *F25B 2400/0403* (2013.01); *F25B 2400/0411* (2013.01); *F25B 2600/2501* (2013.01); *F25B 2600/2515* (2013.01)

(56) References Cited

U.S. PATENT DOCUMENTS

| | | | |
|---|---|---|---|
| 4,270,363 A | | 6/1981 | Maring et al. |
| 4,321,797 A | * | 3/1982 | Yaeger .................... F24D 17/02 62/238.6 |
| 5,265,433 A | | 11/1993 | Beckwith |
| 5,826,433 A | * | 10/1998 | Dube ....................... F25B 41/04 454/236 |
| 8,250,874 B2 | * | 8/2012 | Ikegami ............. B60H 1/00335 165/100 |
| 9,008,136 B2 | * | 4/2015 | Xuan .................... H01S 3/0815 372/34 |
| 2006/0179874 A1 | * | 8/2006 | Barger ..................... F25B 6/04 62/506 |
| 2016/0001636 A1 | * | 1/2016 | Terada ...................... F25B 5/02 62/160 |
| 2016/0352062 A1 | * | 12/2016 | Takigawa ............... H01S 3/0014 |

FOREIGN PATENT DOCUMENTS

| | | |
|---|---|---|
| JP | 2009-014298 | 1/2009 |
| JP | 2011-163698 | 8/2011 |
| JP | 2012-245501 | 12/2012 |

\* cited by examiner

FIG. 7 - PRIOR ART -
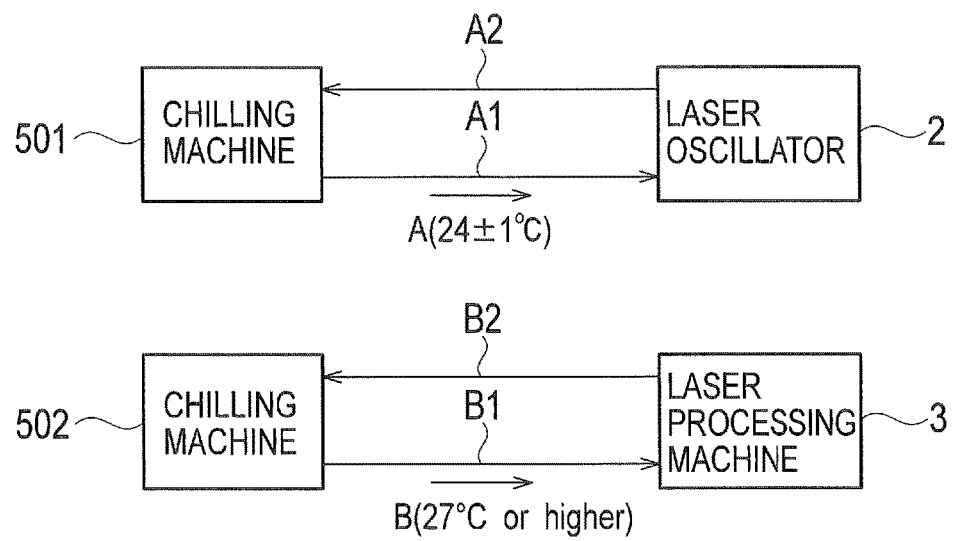

CHILLING MACHINE

TECHNICAL FIELD

The present invention relates to a chilling machine that can be utilized suitably as a cooling system for a laser processing apparatus.

BACKGROUND ART

There are two supply destinations of coolant in a laser processing apparatus. Coolants at different temperatures are supplied to the two supply destinations, respectively. One of the supply destinations is a laser oscillator, and coolant at about 24° C. is supplied to the laser oscillator, for example. The other of the supply destinations is a laser processing machine, and coolant at 27° C. or higher that is higher than the temperature of the coolant for the laser oscillator is supplied to the laser processing machine, for example.

In a prior-art cooling system for a laser processing apparatus, two chilling machines 501 and 502 are prepared as shown in FIG. 7. The chilling machine 501 circulates coolant A (24±1° C.) to a laser oscillator 2 through a supply pipe A1 and a return pipe A2. The chilling machine 502 circulates coolant B (27° C. or higher) to a laser processing machine 3 through a supply pipe B1 and a return pipe B2.

However, a system that uses two chilling machine is less economical, because equipment cost, installation space and consumed electric power are all required for the two. A patent Document 1 listed below discloses one chilling machine that circulates coolant for two circulatory systems.

In the chilling machine disclosed in the Patent Document 1, a reheater (sub heat exchanger) is interposed between a compressor and a condenser in a refrigeration cycle, and coolant (refrigerant) whose temperature is increased by the reheater is circulated as high temperature coolant. Namely, the high temperature coolant is generated by utilizing heats of refrigerant that has absorbed exhausted heats of a supply destination of a low temperature coolant.

PRIOR ART DOCUMENT

Patent Document

Patent Document 1: Japanese Patent Application Publication No. H8-261626

SUMMARY OF INVENTION

However, only by interposing the reheater between the compressor and the condenser in the refrigeration cycle, a following problem may occur. Namely, if heat quantity exhausted by the supply destination of the low temperature coolant (a heat generation source) is large (e.g. in a high-load operation state in which the laser oscillator as the heat generation source operates at its maximum output power), temperature of the high temperature coolant is increased excessively, and thereby a thermal load of the refrigeration cycle increases and its cooling power may become insufficient.

An object of the present invention is to provide a chilling machine by which a stable cooling effect can be brought regardless of an operation state of a supply destination of low temperature coolant.

An aspect of the present invention provides a chilling machine comprising: a refrigerant circuit through which refrigerant circulates; a compressor, a condenser, a first expander, an evaporator and an accumulator that are sequentially provided on the refrigerant circuit along a flow of the refrigerant: a coolant circuit through which coolant circulates between a tank of coolant, and a first supply destination and a second supply destination to which the coolant is supplied at different temperatures; and a chiller that is provided on the coolant circuit with the evaporator disposed therewithin, and cools the coolant by heat-exchanging between the refrigerant and the coolant, wherein the coolant circuit includes: a first supply path through which low temperature coolant is supplied to the first supply destination, and a second supply path through which high temperature coolant whose temperature is higher than temperature of the low temperature coolant is supplied to the second supply destination, and the refrigerant circuit includes: a first reheater that increases temperature of the coolant supplied through the second supply path by heats of the refrigerant discharged from the compressor, a first selective path that supplies the refrigerant discharged from the compressor to the condenser by bypassing the first reheater, a second selective path that supplies the refrigerant discharged from the compressor to the condenser through the first reheater, and a controller that adjusts quantity of the refrigerant passing through the first selective path and quantity of the refrigerant passing through the second selective path.

Note that the "low temperature" coolant means that the temperature of the coolant to be supplied to the first supply destination is lower than the temperature of the coolant to be supplied to the second supply destination, but doesn't mean that the temperature of itself is low. Similarly, the "high temperature" coolant means that the temperature of the coolant to be supplied to the second supply destination is higher than the temperature of the coolant to be supplied to the first supply destination, but doesn't mean that the temperature of itself is high.

According to the aspect, it is possible to control the quantity of the refrigerant flowing through the first reheater and the quantity of the refrigerant bypassing the first reheater by the controller. Therefore, even when exhausted heats of the first supply destination to which the low temperature coolant is supplied are small, it is possible to prevent temperature of the high temperature coolant from decreasing (insufficient increase of the temperature) by increasing the quantity of the refrigerant flowing through the first reheater. Even when the exhausted heats of the first supply destination to which the low temperature coolant is supplied are large, it is possible to prevent temperature of the high temperature coolant from increasing excessively. Therefore, it is possible to supply the coolant at an adequate temperature(s) to the first and second supply destinations stably, regardless of a state of the first supply destination.

It is preferable that the refrigerant circuit further includes a third selective path that is branched from the second selective path between the first reheater and the condenser on the second selective path to supply the refrigerant to the evaporator by bypassing the condenser and the first expander, a second reheater that increases temperature of the coolant supplied through the second selective path by heats of the refrigerant that has passed through the first reheater, and a second expander that decompresses the refrigerant that has passed through the second reheater and then supplies the refrigerant to the evaporator, are provided on the third selective path, and a flow divider that branches, in a state where the refrigerant is flowing through the second selective path, a flow of the refrigerant that has passed through the first reheater also to the third selective path from the second selective path, and is controlled by the controller, is provided on the refrigerant circuit.

According to this configuration, it is possible to increase the temperature of the high temperature coolant effectively at both of the first reheater and the second reheater. Therefore, even when the exhausted heats of the first supply destination are small, it is possible to prevent the temperature of the high temperature coolant from decreasing (insufficient increase of the temperature) effectively.

It is preferable that the first reheater and the second reheater is a counter-flow type heat exchanger that is configured so that a flow of the coolant flowing in the first reheater and the second reheater is counter to a flow of the refrigerant that flows through the first reheater and then flows through the second reheater.

According to the heat exchanger like this, it is possible to exchange heats efficiently between the refrigerant and the coolant within the first reheater and the second reheater.

It is preferable that, in a state where the refrigerant is flowing through the second selective path, the controller increases quantity of the refrigerant flowing through the first selective path when temperature of the coolant flowing through the first supply path reduces lower than predetermined temperature.

According to this, cooling performance of a refrigeration cycle can be enhanced.

BRIEF DESCRIPTION OF DRAWINGS

FIG. 7 It is a schematic diagram of prior-art chilling machines.

DESCRIPTION OF EMBODIMENTS

Figure 1:
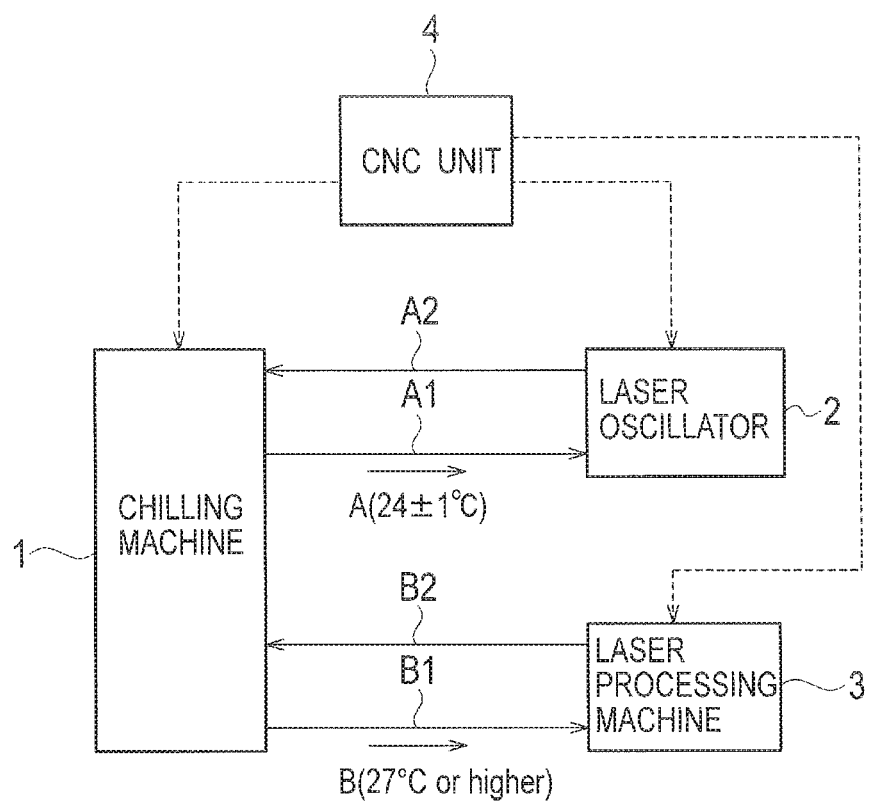
FIG. 1 It is a schematic diagram of a cooling system for a laser processing apparatus provided with a chilling machine according to an embodiment.

Hereinafter, a cooling system for a laser processing apparatus provided with a chilling machine 1 according to an embodiment will be described with reference to the drawings. As shown in FIG. 1, the cooling system includes the chilling machine 1, and a laser oscillator 2 and a laser processing machine 3 that are supply destinations of coolant (heat generation sources). Coolants at different temperatures are supplied to the laser oscillator 2 and the laser processing machine 3, respectively. The coolant circulates through the chilling machine 1, the laser oscillator 2, and the laser processing machine 3.

The coolant A (e.g. 24±1° C.) is supplied from the chilling machine 1 to the laser oscillator 2 through a supply port A1, and returned from the laser oscillator 2 to the chilling machine 1 through a discharge port A2. In addition, the coolant B (e.g. 27° C. or higher) is supplied from the chilling machine 1 to the laser processing machine 3 through a supply port B1, and returned from the laser processing machine 3 to the chilling machine 1 through a discharge port B2.

The laser oscillator 2 amplifies laser light having single wavelength, and emits it out to the laser processing machine 3. The laser processing machine 3 guides the laser light emitted from the laser oscillator 2, while propagating it through an optical path, to a coordinate that is controlled by a controller 4 that also functions as a CNC (Computer Numeric Control) unit to carry out laser processing. The controller 4 communicates also with the laser oscillator 2 and the chilling machine 1 in addition to the laser processing machine 3 to control the entire cooling system.

Figure 2:
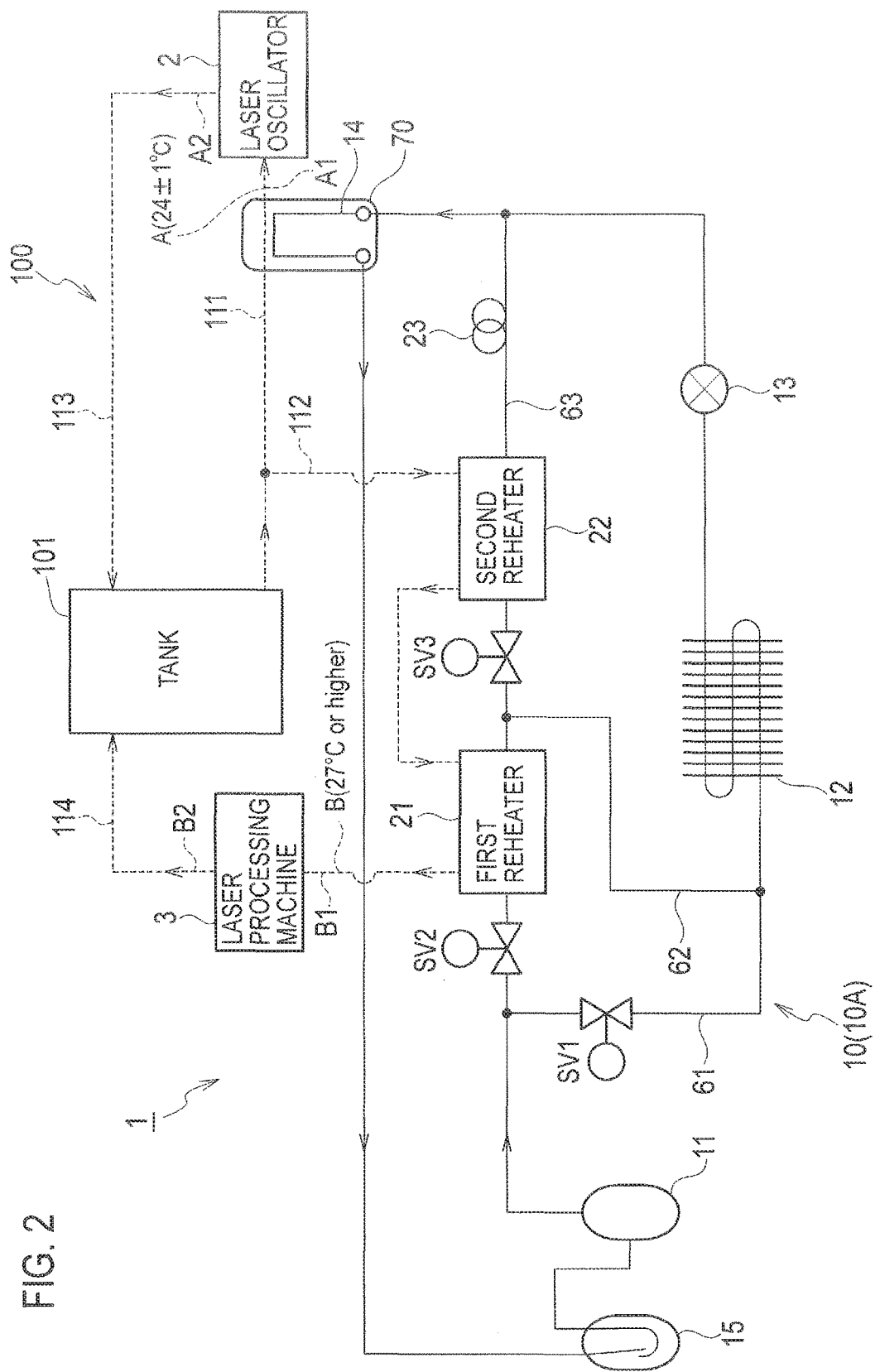
FIG. 2 It is a circuit diagram of the chilling machine.

The chilling machine 1 controls temperature of the low temperature coolant A and temperature of the high temperature coolant B. Note that the "low temperature" coolant A means that the temperature of the coolant A is lower than the temperature of the coolant B, but doesn't mean that the temperature of itself is low. Similarly, the "high temperature" coolant B means that the temperature of the coolant B is higher than the temperature of the coolant A, but doesn't mean that the temperature of itself is high. Namely, the temperature of the coolant A and the temperature of the coolant B are controlled by the single chilling machine 1. As shown in FIG. 2, the chilling machine 1 includes a refrigerant circuit 10 for circulating refrigerant, and a coolant circuit 100 for circulating the coolant(s) between a tank 101 and the supply destinations of the coolants A and B (the laser oscillator 2 and the laser processing machine 3). On a circulation path of the coolant circuit 100, a chiller 70 that cools the coolant(s) by heat-exchanging between the refrigerant and the coolant(s) is provided.

The coolant circuit 100 includes a first supply path 111 through which the low temperature coolant A (e.g. 24±1° C.) is supplied to the laser oscillator 2 as a first supply destination, and a second supply path 112 through which the high temperature coolant B (e.g. 27° C. or higher) is supplied to the laser processing machine 3 as a second supply destination.

The first supply path 111 is connected with the supply port A1 of the laser oscillator 2, and the second supply path 112 is connected with the supply port B1 of the laser processing machine 3 via a second reheater 22 and a first reheater 21 that will be described later. Note that, in the present embodiment, an upstream portion of the second supply path 112 is shared with the first supply path 111 (it can be also stated that the second supply path 112 is branched from the first supply path 111). The discharge port A2 of the laser oscillator 2 is connected with the tank 101 by a return path 113, and the discharge port B2 of the laser processing machine 3 is connected with the tank 101 by a return path 114.

One end of the first supply path 111 is connected with a discharge port near a bottom of the tank 101, and the other end thereof is connected with an inlet port of the chiller 70. On the first supply path 111, a pressure pump (not shown in the drawings) and a valve(s) (not shown in the drawings) are also provided. An outlet port of the chiller 70 is connected with the supply port A1 of the laser oscillator 2.

One end of the second supply path 112 is connected with the discharge port near the bottom of the tank 101, and the other end thereof is connected with the supply port B1 of the laser processing machine 3. On the second supply path 112, a pressure pump (not shown in the drawings) and a valve(s) (not shown in the drawings) are also provided (in the present embodiment, the pressure pump and the valve are provided on a shared section with the first supply path 111). On the second supply path 112, the reheaters (the second reheater 22 and the first reheater 21) interposed on the circulation path of the refrigerant circuit 10 are provided. The coolant B that has passed through the reheaters 21 and 22 is supplied to the laser processing machine 3.

On the other hand, a compressor 11, a condenser 12, an expansion valve (first expander) 13, an evaporator 14 disposed within the chiller 70, and an accumulator 15 are provided on the refrigerant circuit 10 in this order. The refrigerant discharged from the compressor 11 is condensed at the condenser 12. The refrigerant condensed at the condenser 12 is decompressed at the expansion valve 13, and then evaporated at the evaporator 14. The evaporated refrigerant is returned to the compressor 11 through the accumulator 15. This path is a main portion of a refrigeration cycle 10A. The compressor 11 has specification capable of controlling quantity of the refrigerant circulated in the refrigeration cycle 10A.

In addition, the first reheater 21 and the second reheater that can be selectively utilized are provided between the compressor 11 and the evaporator 14 on the refrigerant circuit 10. The reheaters 21 and 22 are heat exchangers that increase the temperature of the coolant B to be supplied to the laser processing machine 3 through the second supply path 112 to 27° C. or higher by utilizing heats of high temperature refrigerant discharged from the compressor 11 (i.e. exhausted heats of the laser oscillator 2 that have been absorbed from the coolant at the chiller 70).

A first selective path 61, a second selective path 62, and a third selective path 63 are provided in the refrigerant circuit 10. The first selective path 61 supplies the refrigerant discharged from the compressor 11 to the condenser 12 by bypassing the first reheater 21. The second selective path 62 supplies the refrigerant discharged from the compressor 11 to the condenser 12 through the first reheater 21. Note that, in the present embodiment, an upstream portion and a downstream portion of the second selective path 62 are shared with the first selective path 61 (it can be also stated that the second selective path 62 is branched from the first selective path 61, and then converged into the first selective path 61). The third selective path 63 is branched from the second selective path 62 between the first reheater 21 and the condenser 12, and supplies the refrigerant that has passed through the first reheater 21 to the evaporator 14 through the second reheater 22 and a capillary tube (second expander) 23 by bypassing the condenser 12 and the expansion valve 13.

The coolant is circulated to the second reheater 22 in series with the first reheater 21, and the second reheater 22 increases the temperature of the coolant by heats of the refrigerant that has passed through the first reheater 21. The capillary tube 23 decompresses the refrigerant that has passed through the second reheater 22, and sends the decompressed refrigerant to the evaporator 14.

A first electromagnetic valve SV1 is provided on an upstream portion of the first selective path 61, a second electromagnetic valve SV2 is provided on an upstream portion of the second selective path 62, and a third electromagnetic valve SV3 is provided on an upstream portion of the third selective path 63. Quantities of the refrigerant(s) flowing through the selective paths 61 to 63 are controlled by adjusting valve openings of the electromagnetic valves SV1 to SV3 (adjusting between a range of the valve opening 0 to 100%).

Therefore, the first electromagnetic valve SV1 and the second electromagnetic valve SV2 correspond to a main component(s) of the controller 4 that adjusts the quantities of the refrigerant(s) flowing through the first selective path 61 and/or the second selective path 62. In addition, the third electromagnetic valve SV3 corresponds to a main component of a flow divider that branches, in a state where the refrigerant is flowing through the second selective path 62, a flow of the refrigerant that has passed through the first reheater 21 also to the third selective path 63 from the second selective path 62. The first electromagnetic valve SV1, the second electromagnetic valve SV2, and the third electromagnetic valve SV3 are controlled by the controller 4.

Note that the first reheater 21 and the second reheater 22 are disposed on the coolant circuit 100 so that the coolant flows the first reheater 21 sequentially after the coolant has passed the second reheater 22. Therefore, in the first reheater 21 and the second reheater 22, the flow of the refrigerant and the flow of the coolant are counter to each other. Namely, the reheaters 21 and 22 are a counter-flow type heat exchanger. By running the flow of the refrigerant and the flow of the coolant counter to each other, it becomes possible to improve efficiency of heat-exchanging between the refrigerant and the coolant at the reheaters 21 and 22.

Next, operation modes of the chilling machine 1 will be described with reference to FIG. 3 to FIG. 6. Note that the refrigerant flows along a route(s) indicated by bold lines in the drawings.

Figure 3:
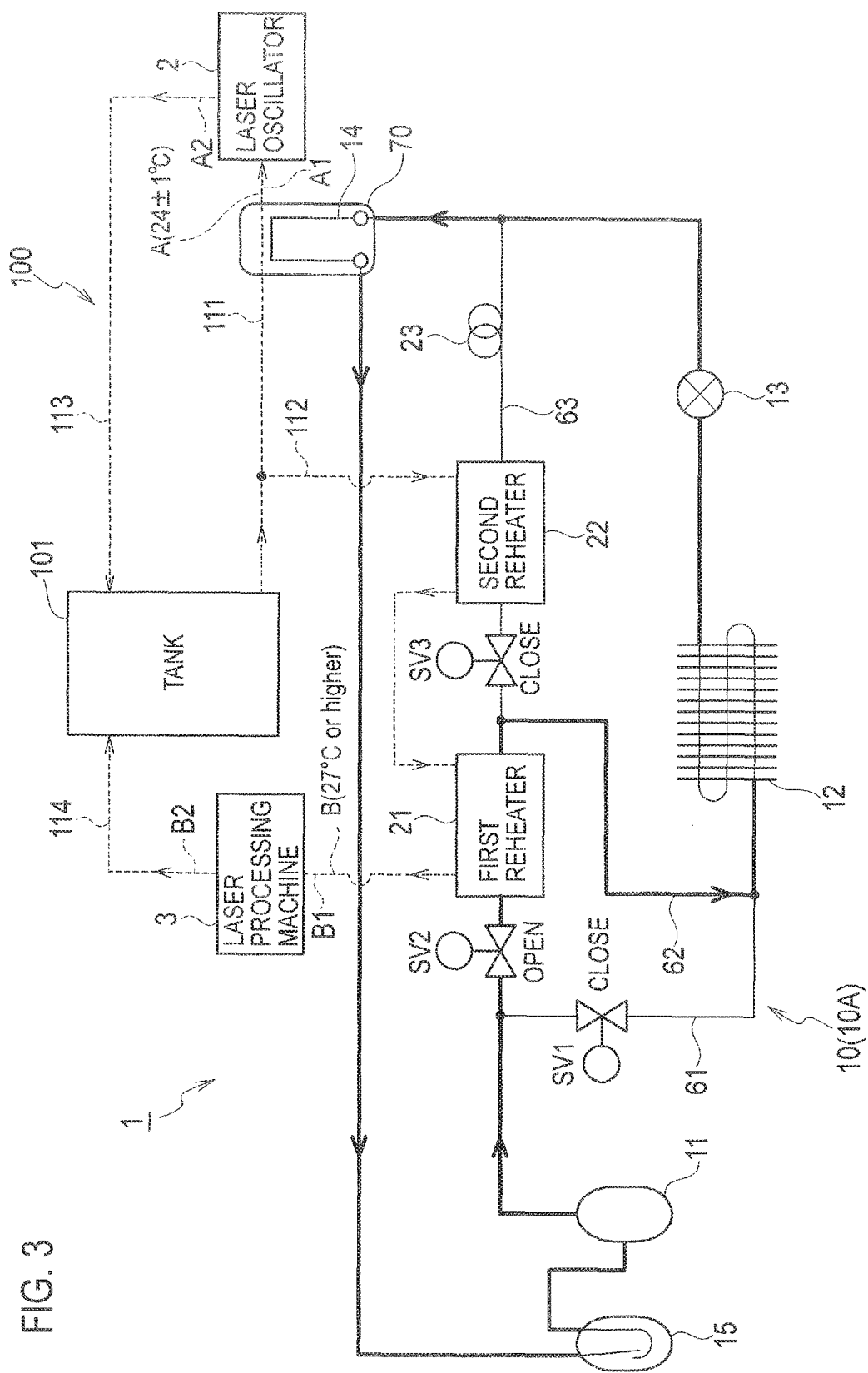
FIG. 3 It is a circuit diagram showing flows of refrigerant in a normal operation.

(1) Normal Operation Mode:

As shown in FIG. 3, in a normal operation mode, the first electromagnetic valve SV1 is closed, the second electromagnetic valve SV2 is opened and the third electromagnetic valve SV3 is closed. The refrigerant discharged from the compressor 11 flows through the second selective path 62 to exchange heats with the coolant at the first reheater 21. The exhausted heats of the laser oscillator absorbed by the refrigerant are utilized as energies for increasing the temperature of the coolant passing through the second supply path 112. The coolant B whose temperature has been increased to 27° C. or higher at the first reheater 21 is supplied to the laser processing machine 3.

Figure 4:
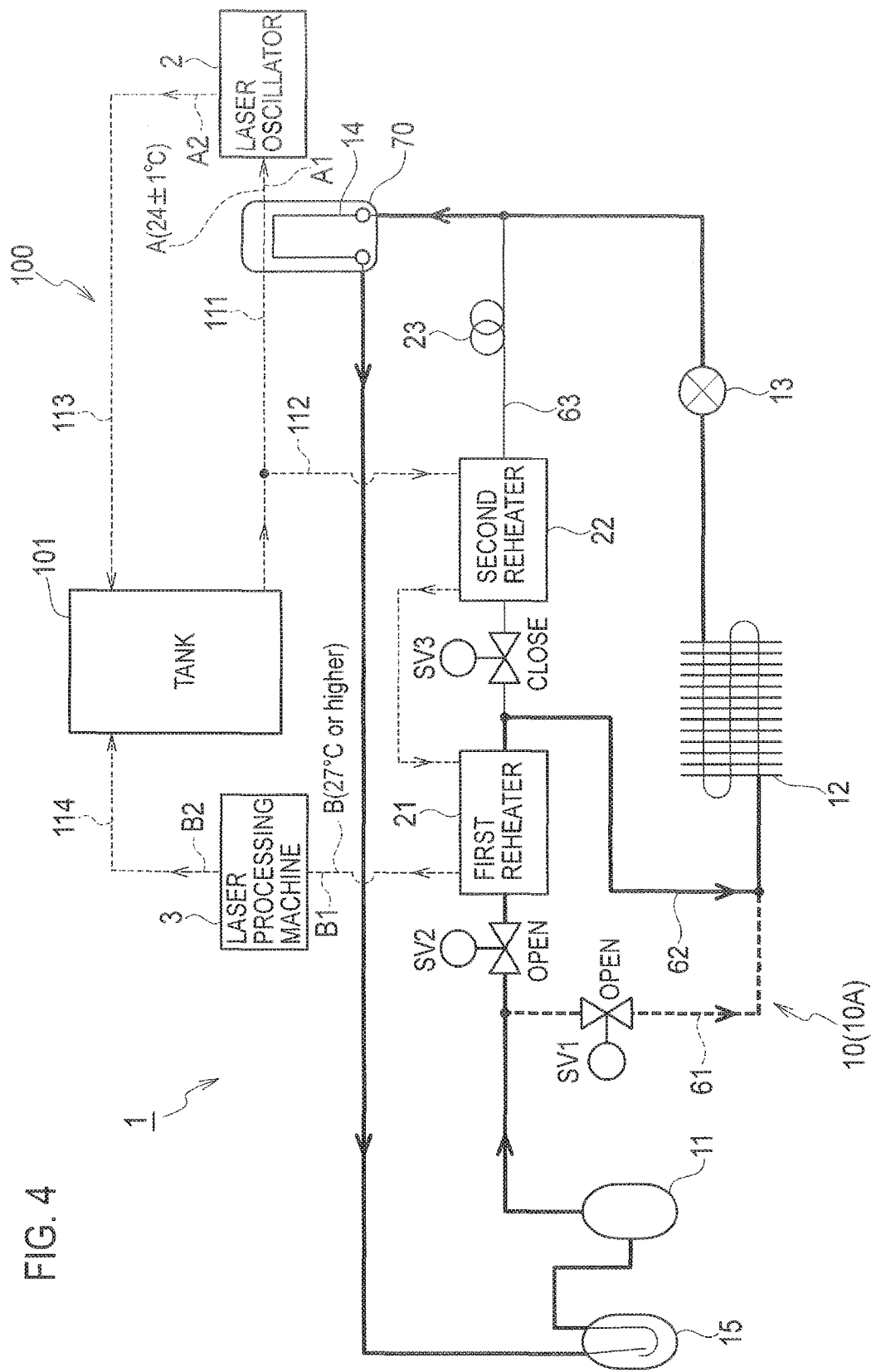
FIG. 4 It is a circuit diagram showing flows of the refrigerant when temperature of high temperature coolant increases excessively.

(2) Operation Mode in Case Where Temperature of Coolant B Increases Excessively During Normal Operation Mode:

When the laser oscillator 2 operates at its maximum output power (a high-load operation state) in the normal operation mode (i.e. in a state where the refrigerant is flowing through the second selective path 62 as indicated by a solid bold line(s) in FIG. 4), its exhausted heats increase. As the result, there may be a case where the temperature of the high temperature coolant B is increased excessively. In this case, a thermal load to the refrigeration cycle 10A may increase and thereby its cooling performance may become insufficient.

Then, the first electromagnetic valve SV1 is adjusted so that its valve opening is increased, and the second electromagnetic valve SV2 is adjusted so that its valve opening is decreased. Therefore, as shown by a dotted bold line(s) in FIG. 4, quantity of the refrigerant passing through the first selective path 61 (quantity of the refrigerant not passing through the first reheater 21) increases. Namely, quantity of the refrigerant passing through the second selective path 62 (quantity of the refrigerant passing through the first reheater 21) decreases. As the result, cooling capacity by the refrigerant circuit 10 for the coolant flowing through the second supply path 112 is enhanced, and the temperature of the high temperature coolant B to be supplied to the laser processing machine 3 is restricted from increasing. In a case where its maximum cooling capacity is needed, the second electromagnetic valve SV2 is fully closed and the first electromagnetic valve SV1 is fully opened, so that the refrigerant bypasses the first reheater 21 and is supplied directly to the condenser 12. Since the refrigerant supplied to the condenser 12 increases to the maximum, the cooling capacity becomes maximum.

By controlling the first electromagnetic valve SV1 and the second electromagnetic valve SV2 in this manner, it becomes possible to adjust the quantity of the refrigerant flowing through the first reheater 21 and the quantity of the refrigerant that bypasses the first reheater 21 and is supplied directly to the condenser 12. By increasing the quantity of the refrigerant that bypasses the first reheater 21 and is supplied directly to the condenser 12, it becomes possible to prevent the temperature of the high temperature coolant B from increasing excessively and to enhance the cooling capacity by the refrigeration cycle 10A, even if the exhausted heats of the laser oscillator 2 (the supply destination of the low temperature coolant A (heat generation source)) are large. In addition, by increasing the quantity of the refrigerant flowing through the first reheater 21, it becomes possible to prevent the temperature of the high temperature coolant B from decreasing (insufficient increase of its temperature), even if the exhausted heats of the laser oscillator 2 (the supply destination of the low temperature coolant A (heat generation source)) are small. Therefore, it is possible to supply the coolant at an adequate temperature to the laser processing machine 3 (the supply destination of the high temperature coolant B (heat generation source)) stably, regardless of an operation state of the laser oscillator 2 (the supply destination of the low temperature coolant A (heat generation source)).

Figure 5:
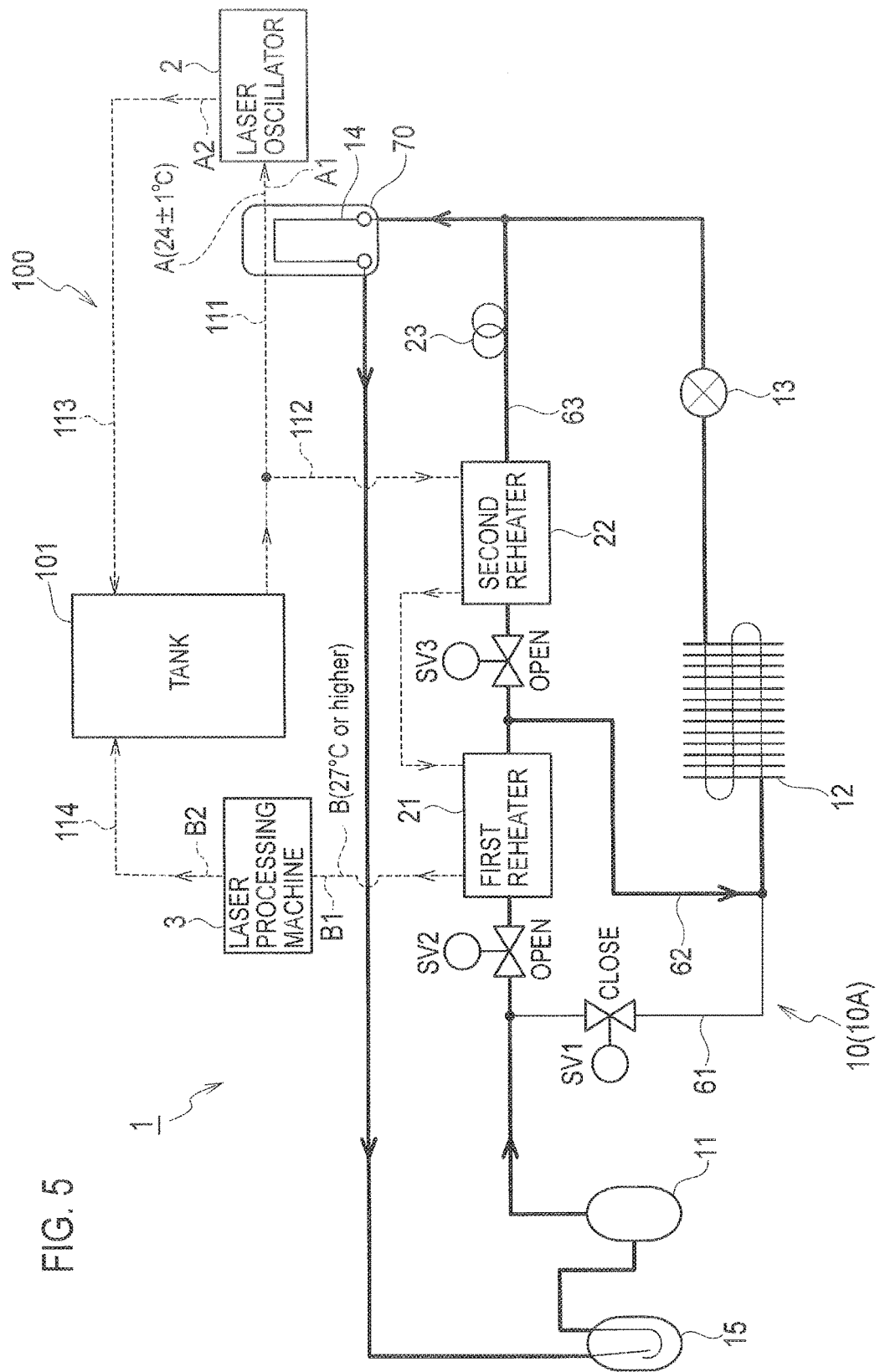
FIG. 5 It is a circuit diagram showing flows of the refrigerant in a dew condensation prevention operation.

(3) Operation Mode for Dew Condensation Prevention During Low-Load Operation:

In a case where the exhausted heats of the laser oscillator 2 decrease during a waiting state (low-load state) of the laser oscillator 2 and the temperature of the high temperature coolant B decreases, the first electromagnetic valve SV1 is closed, the second electromagnetic valve SV2 is opened and the third electromagnetic valve SV3 is opened, as shown in FIG. 5. The refrigerant sequentially flows through the first reheater 21 and the second reheater 22. Therefore, by utilizing the two reheaters 21 and 22, it becomes possible to enhance the temperature increase of the coolant by heats of the refrigerant discharged from the compressor 11 almost doubly. As the result, it becomes possible to prevent the temperature of the high temperature coolant B from decreasing (insufficient increase of the temperature), and to prevent dew condensation of piping paths of the laser processing machine 3 under hot and humid environment.

Figure 6:
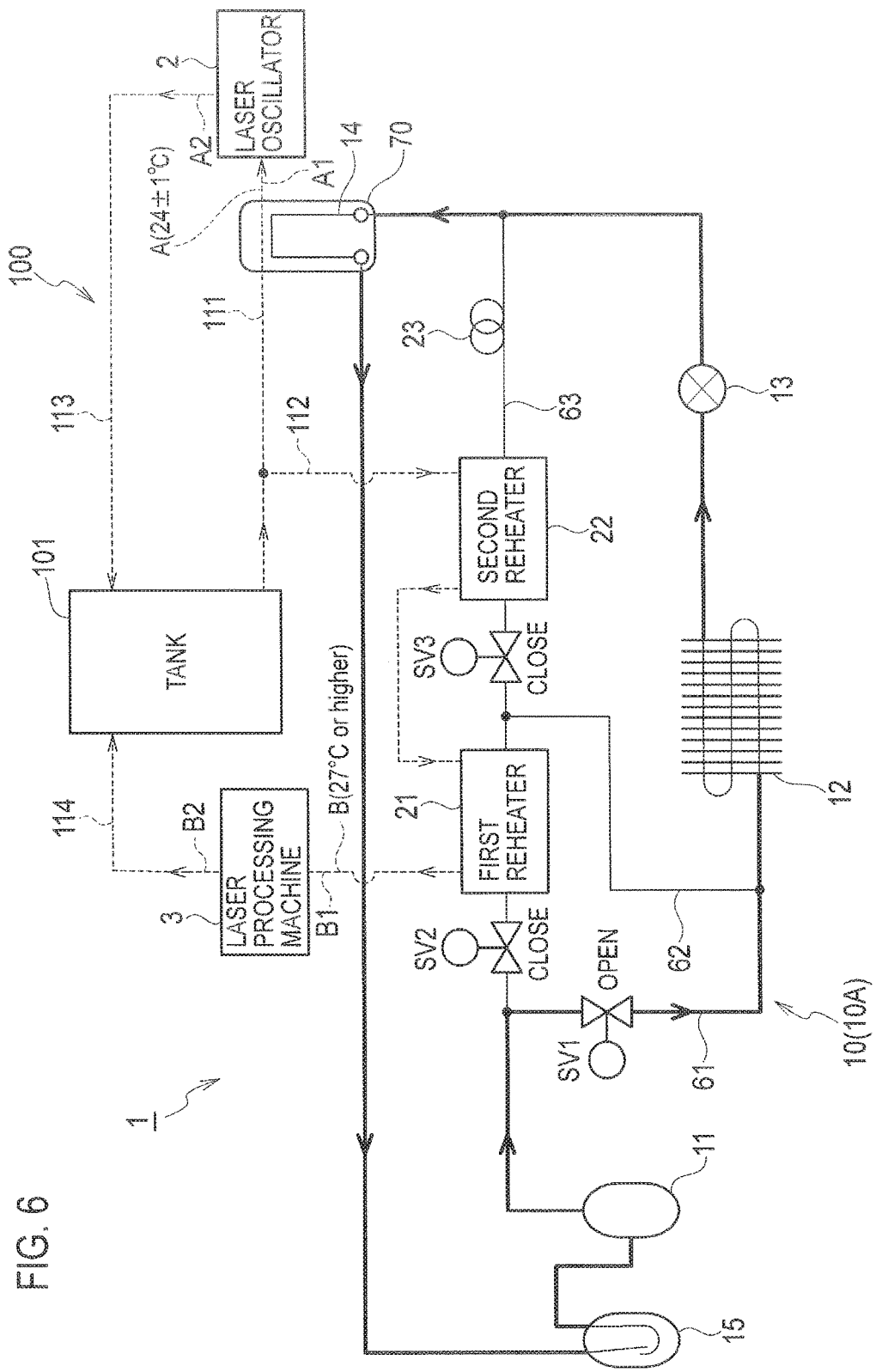
FIG. 6 It is a circuit diagram showing flows of the refrigerant in an operation at the maximum cooling performance operation.

(4) Operation Mode for Resuming from Energy-Saving Mode:

In resumption from an energy-saving mode, it is needed to minimize time required for resuming the cooling performance. Therefore, as shown in FIG. 6, the first electromagnetic valve SV1 is opened, the second electromagnetic valve SV2 is closed and the third electromagnetic valve SV3 is closed. The refrigerant discharged from the compressor 11 bypasses the first reheater 21, and is supplied directly to the condenser 12. Since the refrigerant supplied to the condenser 12 increases to the maximum, the cooling performance becomes maximum. At this time, the reheaters 21 and 22 don't increase the temperature of the coolant.

The invention claimed is:

1. A chilling machine comprising:
    a refrigerant circuit through which refrigerant circulates;
    a compressor, a condenser, a first expander, an evaporator and an accumulator being sequentially provided on the refrigerant circuit along a flow of the refrigerant such that the flow of the refrigerant along the refrigerant circuit passes through each of the compressor, the condenser, the first expander, the evaporator and the accumulator a first time, in the stated order, prior to passing through any of the compressor, the condenser, the first expander, the evaporator and the accumulator a second time;
    a coolant circuit through which coolant circulates between a tank of coolant, and a first supply destination and a second supply destination to which the coolant is supplied at different temperatures; and
    a chiller that is provided on the coolant circuit with the evaporator disposed therewithin, and cools the coolant by heat-exchanging between the refrigerant and the coolant, wherein
    the coolant circuit includes:
        a first supply path through which low temperature coolant is supplied to the first supply destination, and
        a second supply path through which high temperature coolant whose temperature is higher than temperature of the low temperature coolant is supplied to the second supply destination, and
    the refrigerant circuit includes:
        a first reheater that increases a temperature of the coolant supplied through the second supply path by heat of the refrigerant discharged from the compressor,
        a first selective path that supplies the refrigerant discharged from the compressor to the condenser by bypassing the first reheater,
        a second selective path that supplies the refrigerant discharged from the compressor to the condenser through the first reheater, and
        a controller configured to adjust a quantity of the refrigerant passing through the first selective path and a quantity of the refrigerant passing through the second selective path.

2. The chilling machine according to claim 1, wherein, in a state where the refrigerant is flowing through the second selective path, the controller is configured to increase a quantity of the refrigerant flowing through the first selective path when a temperature of the coolant flowing through the second supply path increases higher than a predetermined temperature.

3. The chilling machine according to claim 1, wherein the refrigerant circuit further comprises:
    a first valve provided on the first selective path;
    a second valve provided on the second selective path; and
    wherein the controller is configured to adjust the quantity of the refrigerant passing through the first selective path by controlling the first valve and the quantity of the refrigerant passing through the second selective path by controlling the second valve.

4. A chilling machine comprising:
    a refrigerant circuit through which refrigerant circulates;
    a compressor, a condenser, a first expander, an evaporator and an accumulator that are sequentially provided on the refrigerant circuit along a flow of the refrigerant:
    a coolant circuit through which coolant circulates between a tank of coolant, and a first supply destination and a second supply destination to which the coolant is supplied at different temperatures; and
    a chiller that is provided on the coolant circuit with the evaporator disposed therewithin, and cools the coolant by heat-exchanging between the refrigerant and the coolant, wherein the coolant circuit includes:
a first supply path through which low temperature coolant is supplied to the first supply destination, and
a second supply path through which high temperature coolant whose temperature is higher than temperature of the low temperature coolant is supplied to the second supply destination, and
the refrigerant circuit includes:
a first reheater that increases a temperature of the coolant supplied through the second supply path by heat of the refrigerant discharged from the compressor,
a first selective path that supplies the refrigerant discharged from the compressor to the condenser by bypassing the first reheater,
a second selective path that supplies the refrigerant discharged from the compressor to the condenser through the first reheater,
a controller configured to adjust a quantity of the refrigerant passing through the first selective path and a quantity of the refrigerant passing through the second selective path,
a third selective path that is branched from the second selective path between the first reheater and the condenser on the second selective path to supply the refrigerant to the evaporator by bypassing the condenser and the first expander,
a second reheater that increases a temperature of the coolant supplied through the second selective path by heat of the refrigerant that has passed through the first reheater, and a second expander that decompresses the refrigerant that has passed through the second reheater and then supplies the refrigerant to the evaporator, are provided on the third selective path, and
a flow divider that branches, in a state where the refrigerant is flowing through the second selective path, a flow of the refrigerant that has passed through the first reheater also to the third selective path from the second selective path, and is controlled by the controller, is provided on the refrigerant circuit.

5. The chilling machine according to claim 4, wherein,
the first reheater and the second reheater is a counter-flow type heat exchanger that is configured so that a flow of the coolant flowing in the first reheater and the second reheater is counter to a flow of the refrigerant that flows through the first reheater and then flows through the second reheater.

\* \* \* \* \*